US008520817B2

(12) United States Patent
Cansler et al.

(10) Patent No.: US 8,520,817 B2
(45) Date of Patent: Aug. 27, 2013

(54) SYSTEM FOR IDENTIFYING A CALLING PARTY

(75) Inventors: James L. Cansler, Pflugerville, TX (US); Gerard Edwards, San Antonio, TX (US); Scott White, Austin, TX (US); Loraine Sanchez, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1381 days.

(21) Appl. No.: 11/854,853

(22) Filed: Sep. 13, 2007

(65) Prior Publication Data

US 2009/0074164 A1 Mar. 19, 2009

(51) Int. Cl.
*H04M 1/56* (2006.01)

(52) U.S. Cl.
USPC .............. 379/142.16; 379/93.23; 379/142.06; 348/565

(58) Field of Classification Search
USPC ............. 379/102.03, 142.16, 142.01–142.06, 379/93.23; 348/14.04, 14.06, 565
See application file for complete search history.

(56) References Cited

U.S. PATENT DOCUMENTS

| | | | | | |
|---|---|---|---|---|---|
| 5,566,231 A | * | 10/1996 | Sizer, II | ................... | 379/142.16 |
| 5,875,239 A | * | 2/1999 | Koralewski et al. | ..... | 379/142.15 |
| 5,913,174 A | * | 6/1999 | Casarez et al. | ................ | 455/557 |
| 6,707,893 B1 | * | 3/2004 | Basore et al. | .............. | 379/93.23 |
| 6,731,727 B2 | * | 5/2004 | Corbett et al. | .............. | 379/93.35 |
| 6,977,996 B1 | * | 12/2005 | Brothers et al. | ......... | 379/114.05 |
| 7,165,082 B1 | * | 1/2007 | DeVos | .......................... | 711/162 |
| 7,184,522 B2 | * | 2/2007 | Brunelle et al. | ........... | 379/88.17 |
| 7,277,445 B2 | * | 10/2007 | Bartfeld et al. | ............... | 370/401 |
| 7,953,437 B2 | * | 5/2011 | Neuhaus | ....................... | 455/557 |
| 8,009,812 B2 | * | 8/2011 | Bruce et al. | ................ | 379/88.13 |
| 2001/0050977 A1 | | 12/2001 | Gerszber et al. | | |
| 2002/0172338 A1 | * | 11/2002 | Lee et al. | ................. | 379/142.01 |
| 2004/0209640 A1 | | 10/2004 | Urban et al. | | |
| 2007/0036313 A1 | * | 2/2007 | White et al. | ............. | 379/142.17 |
| 2007/0047519 A1 | * | 3/2007 | Bangor et al. | ................. | 370/352 |
| 2007/0133760 A1 | | 6/2007 | Cotignola et al. | | |
| 2007/0153991 A1 | | 7/2007 | Daigle | | |

FOREIGN PATENT DOCUMENTS

| | | |
|---|---|---|
| EP | 1505814 | 2/2005 |
| GB | 2433375 | 6/2007 |
| WO | 2005050954 | 6/2005 |

* cited by examiner

*Primary Examiner* — Simon Sing
(74) *Attorney, Agent, or Firm* — Guntin & Gust PLC; Ralph Trementozzi

(57) ABSTRACT

A system that incorporates teachings of the present disclosure may include, for example, a media content processor having a controller adapted to establish communications with a voicemail system, receive a caller identification (ID) associated with a voicemail message stored in the voicemail system, detect a match between the caller ID and one among one or more communication identifiers recorded in an entry of an address book, retrieve an image excerpt associated with the entry of the address book, present the image excerpt at a media device to identify a calling party that recorded the voicemail message. Other embodiments are disclosed.

20 Claims, 5 Drawing Sheets

200

__(1)__

SYSTEM FOR IDENTIFYING A CALLING PARTY

FIELD OF THE DISCLOSURE

The present disclosure relates generally to caller identification techniques and more specifically to a system for identifying a calling party.

BACKGROUND

It is common today for subscribers of cell phones to identify calling parties by a caller identification (ID) retrieved from signaling information in the call, or by picture ID. A picture ID presentation can be triggered when the caller ID matches an entry in an address book having an association with a picture recorded by the subscriber to assist in identifying a calling party during an incoming call.

DETAILED DESCRIPTION

In one embodiment of the present disclosure, a computer-readable storage medium operating in a media content processor can have computer instructions for presenting at a media device images associated with a media program decoded from a media content source, receiving a video excerpt, associating the video excerpt with one or more communication identifiers recorded in an entry of an address book, receiving a request from a communication device of a calling party to establish communications with the media content processor, identifying a caller identification (ID) from the request, detecting a match between the caller ID and one among the one or more communication identifiers recorded in the entry of the address book, presenting at the media device a Graphical User Interface (GUI) superimposed on the images associated with the decoded media program, and presenting the video excerpt in the GUI to identify the calling party.

In one embodiment of the present disclosure, a media content processor can have a controller adapted to establish communications with a voicemail system, receive a caller ID associated with a voicemail message stored in the voicemail system, detect a match between the caller ID and one among one or more communication identifiers recorded in an entry of an address book, retrieve an image excerpt associated with the entry of the address book, present the image excerpt at a media device to identify a calling party that recorded the voicemail message.

In one embodiment of the present disclosure, a voicemail system can have a controller adapted to receive a redirected call of a calling party, record a voicemail message supplied by the calling party with a caller ID that identifies the calling party, and transmit the caller ID to a media content processor. The media content processor can be adapted to detect a match between the caller ID and one among one or more communication identifiers recorded in an entry of an address book, retrieve an image excerpt associated with the entry of the address book, and present the image excerpt at a media device to identify the calling party that recorded the voicemail message.

In one embodiment of the present disclosure, a communication device can have a controller adapted to receive a request from another communication device of a calling party to establish communications, identify a caller ID from the request, detect a match between the caller ID and one among one or more communication identifiers recorded in an entry of the address book, retrieve a video excerpt associated with the entry of the address book, and present the video excerpt at a display to identify the calling party.

Figure 1:
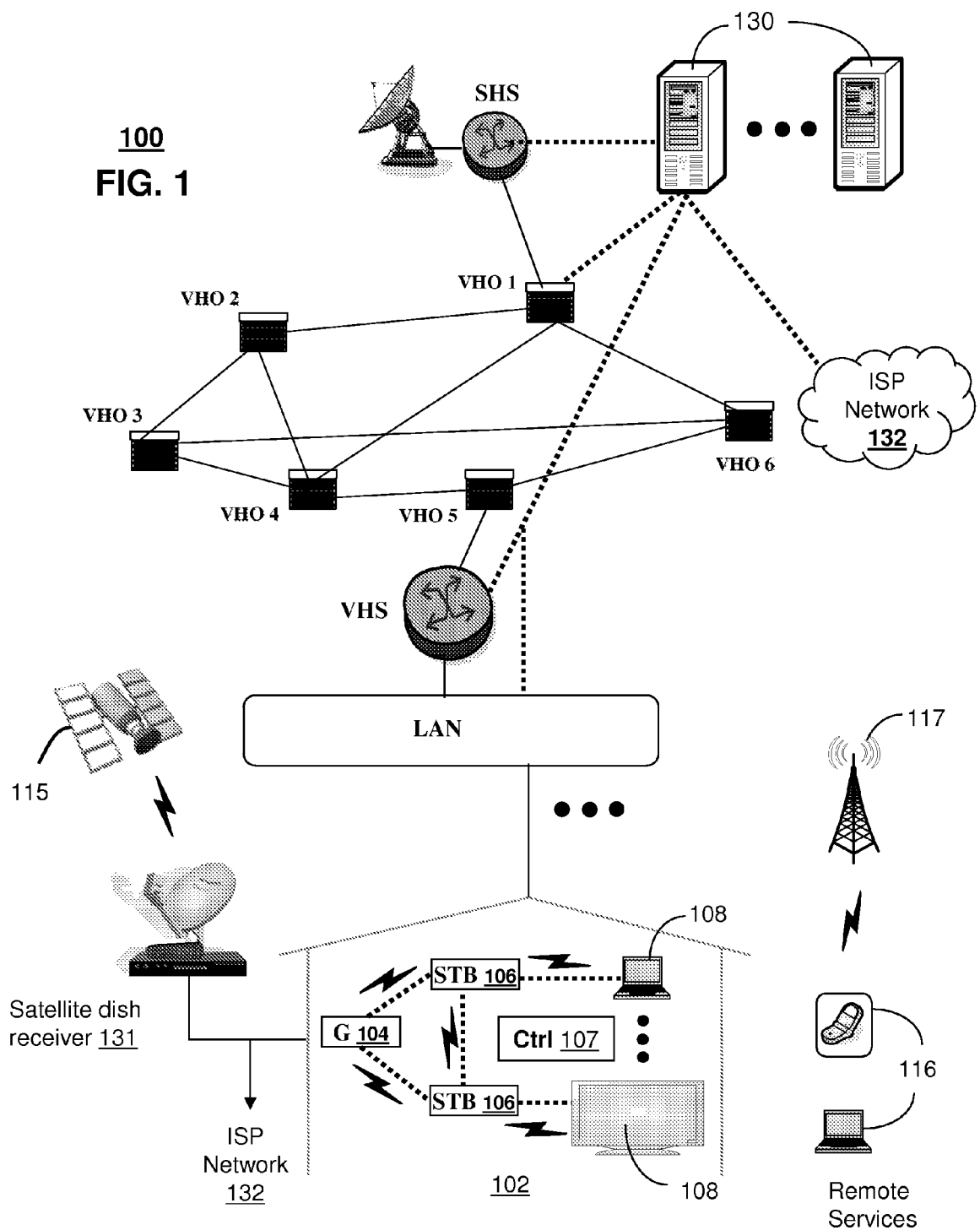
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio-only content, video-only content, and combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media content processors 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media content processors 106 and subsystems of the IPTV media system for services such as video-on-demand (VoD).

The IPTV media system can be coupled to one or more computing devices 130 that can operate as a web or Internet server for providing portal services over an Internet Service Provider (ISP) network 132 to fixed media devices 108 or portable communication devices 116 by way of a wireless base station 117 such as in a cellular communication network operating with common protocols (GSM, CDMA, UMTS, software defined radio, WiMAX, etc.).

A satellite broadcast system can be used in place of the IPTV media system. In this embodiment, signals transmitted by a satellite 115 can be intercepted by a satellite dish receiver 131 coupled to building 102 which conveys satellite media signals to the media content processors 106 by way of gateway 104. Alternatively, the satellite signals can be received and processed by the media content processor 106 over a satellite port of the media content processor coupled to the satellite dish receiver 131. The media content processors 106 can also be equipped with a broadband port that couples to the ISP network 132 for general broadband access.

Although not shown, the communication system 100 can also be combined or replaced with analog or digital broadcast distributions systems such as cable TV systems. It would be apparent therefore to one of ordinary skill in the art that the present disclosure can be applied to any media content communication system.

Figure 2:
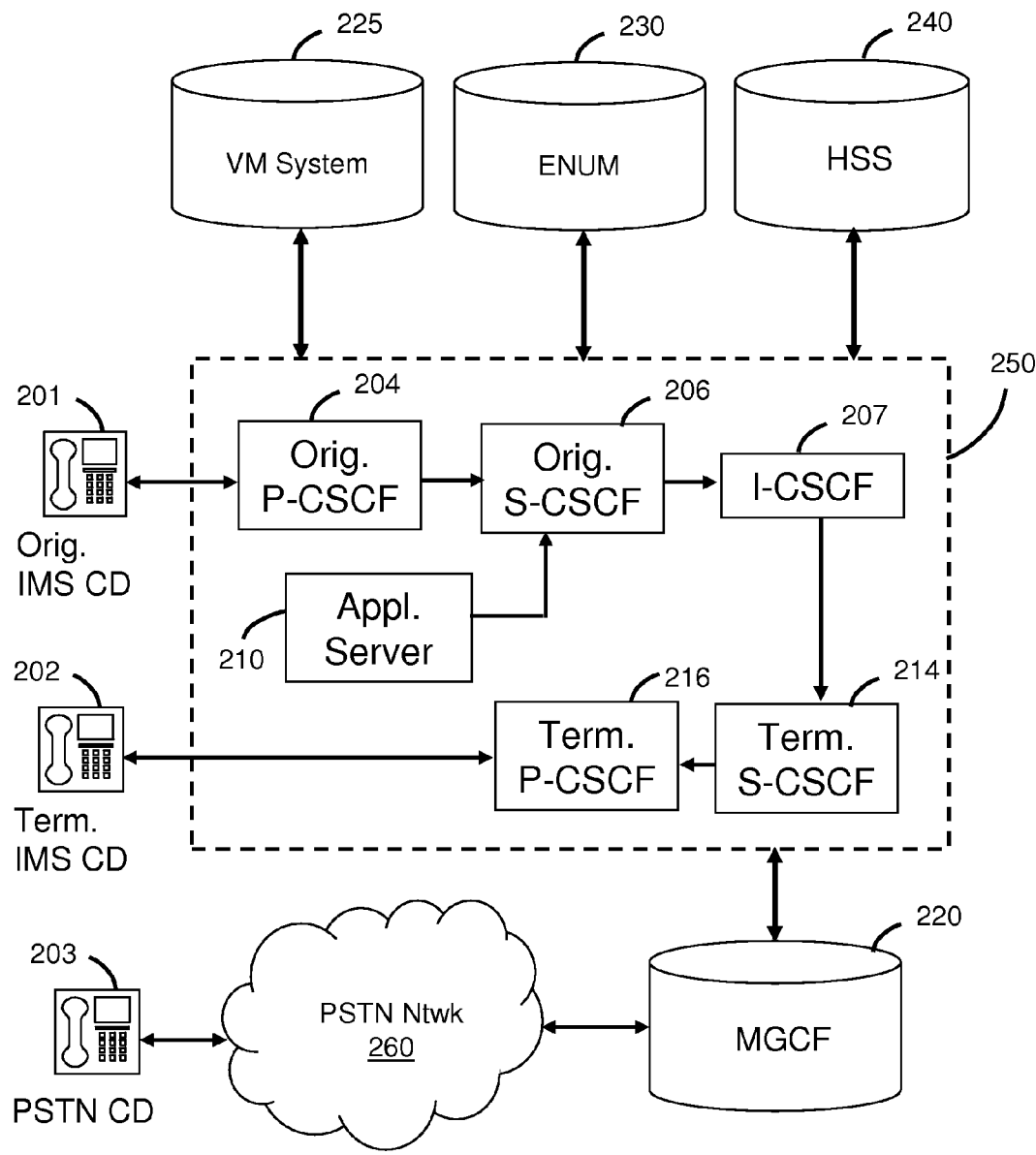
FIG. 2 depicts another exemplary embodiment of the communication system.

FIG. 2 depicts an exemplary embodiment of a communication system 200 employing an IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 (e.g., wired or wireless phones or set top boxes) or a Public Switched Telephone Network (PSTN) CD 203 using a Media Gateway Control Function (MGCF) 220 that connects the call through a common PSTN network 260. CDs 201-203 can be fixed, mobile, wireless and/or wired devices.

IMS CDs 201, 202 can register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 206 can submit queries to the ENUM system 230 to translate an E. 164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

The IMS network 250 can be supplemented with a voicemail system 225. The voicemail system 225 can be an integral part of the application server 210 or an external IMS-compliant system that is accessible by the IMS network 250. The voicemail system 225 can accept redirected calls from calling parties when a called party does not answer a call. The voicemail system 225 can provide a calling party options to record and store voicemail messages, and can store with said voicemail message an identifier for returning the call. The identifier can be the caller ID retrieved by the voicemail system 225 from signaling information (SS7 or SIP) or a callback number retrieved by the voicemail system from the voicemail message using common speech processing techniques. In another embodiment, the voicemail system 225 can be an integral part of the computing devices 130 of FIG. 1 with the functions just described. Accordingly the voicemail system 225 can provide services to one or both of communication systems 100 and 200.

Figure 3:
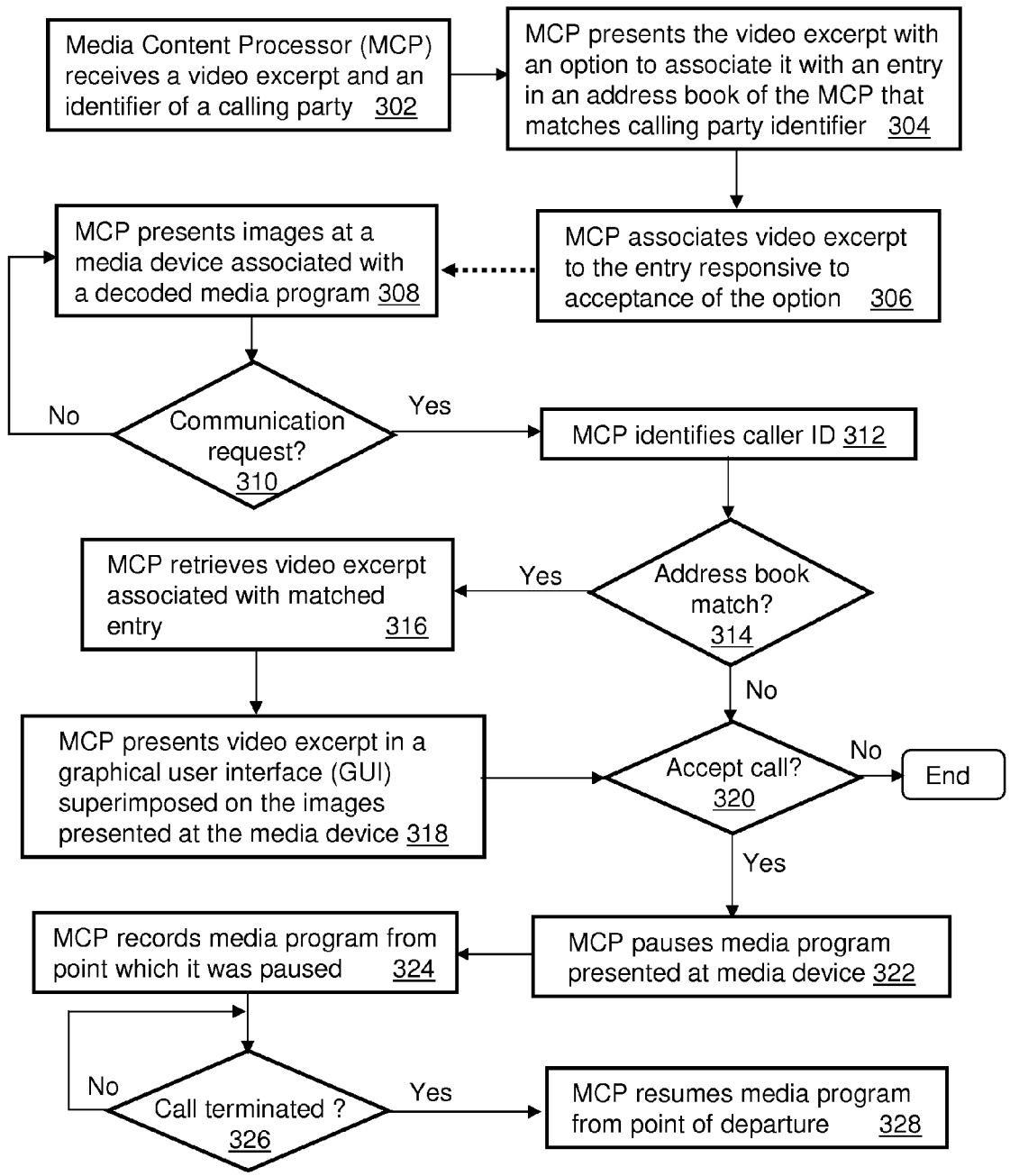
FIG. 3 depicts an exemplary method operating in portions of the communication system.

FIG. 3 depicts an exemplary method 300 operating in portions of the communication system 100. Method 300 begins with step 302 in which a media content processor (MCP) 106 of a subscriber receives a video excerpt with an identifier of a calling party. This step can be the result of a calling party desiring to share a video excerpt with a subscriber of the recipient MCP 106. To accomplish this, the calling party can transmit the video excerpt from the calling party's MCP and direct it to the MCP 106 of the subscriber over the ISP network 132. Alternatively, the calling party can transmit to the MCP 106 of the subscriber the video excerpt from another suitable communication device such as a cell phone.

The identifier of the calling party can be supplied with the video excerpt or can be retrieved by the MCP 106 from signaling information while communicating with one of the communication devices of the calling party. The identifier can represent a common caller ID such as an E. 164 number or SIP URI as previously described. In step 304 the MCP 106 can present the video excerpt to the subscriber by way of media device 108 for review. The video excerpt can be any form of video content. For example the video excerpt may be a recording that shows the calling party saying something (e.g., "Hello, this is Mark calling."). Alternatively, the video excerpt can be other forms of video content that may not show the calling party (e.g., a cartoon that can remind the subscriber of the calling party). Whatever the type of content included in the video excerpt, the subscriber can utilize a presentation of said content to recall the calling party when the video is played during an incoming call.

Accordingly, the video excerpt can represent a video recording with people, a video recording with animation characters, or combinations thereof. The video excerpt can be created by non-commercial means (e.g., calling party makes recording with camcorder or phone with video camera means). Alternatively, the video excerpt can be purchased by the calling party from a video catalog source on the Internet or another suitable source. It would be apparent therefore to an artisan of ordinary skill in the art that the video excerpt can be video content derived from any commercial or non-commercial source.

Referring back to step 304, the MCP 106 can provide the subscriber an option during the presentation to associate the video excerpt with an entry in an address book of the MCP. This option can be triggered when the MCP 106 detects a match between the calling party's identifier and one or more communication identifiers recorded in an entry of the address book. The presentation of said option can be made by a graphical user interface (GUI) presented as a prompt at the media device 108 which the subscriber can respond to by way of the media controller 107. The MCP 106 can associate the video excerpt in step 306 responsive to the subscriber accepting the option through the GUI prompt.

Steps 302-306 can occur at any time. Accordingly, the subscriber can periodically update address book entries stored in the MCP 106 with video excerpts to perform a video caller ID function as described in steps 308.

While steps 302-306 arise in the background, the MCP 106 can be programmed to present images at the media device 107 associated with a decoded media program. The images can be moving or still images. In the case of moving images, the presentation can be a TV program, playback of a DVR recording, video music, etc. Still images can be presented when viewing a personalized media archive (e.g., picture album), or while listening to audio with a still image describing the sound track, pictures of the artists, etc. Thus step 308 can represent the presentation of any media content from any source available to the MCP 106.

While a media program presentation is taking place, the MCP 106 can monitor in step 310 whether a communication request has been made by any third party communication device. If no VoIP or PSTN communication request is detected, the MCP 106 continues its activities in step 308. Otherwise, the MCP 106 proceeds to step 312 where it retrieves by common means a caller ID from signaling information supplied with the communication request. In step 314, the MCP 106 checks whether a match is found between the caller ID and one or more communication identifiers in entries of the address book stored in the MCP. If no match is found, the MCP 106 proceeds to step 320; otherwise, the MCP retrieves in step 316 a video excerpt (if one is available) associated with the matched address book entry. The MCP 106 then presents in step 318 a GUI superimposed on the images of the media program presented in step 308 with the video excerpt played in said GUI. An exemplary representation of this step is shown in FIG. 4.

The canvas 402 represents the presentation area of the media device 108. The GUI referred to earlier is a GUI window 404 that restricts the viewing area of the video excerpt. By presenting the video excerpt in GUI window 404, the subscriber of the MCP 106 viewing said video excerpt can readily identify the calling party by seeing the calling party in the video, or by recalling the content of the video and associating it with the calling party. In step 320, the subscriber can decide to accept or reject the call by way of one or more keypad selections on the media controller 107 ("Accept Call", "End Call" buttons). If the call is rejected, the MCP 106 can direct the call to the voicemail system 225 referred to earlier.

If the call is accepted, the MCP 106 proceeds to step 322 where it can pause presentation of the media program from a departure mark. The MCP 106 can begin to record in step 324 the media program from the departure mark until it detects in step 326 that the call has been terminated. When termination of the call is detected, the MCP 106 resumes presentation of the media program from the departure mark of step 322. Steps 322-328 can provide the subscriber of the MCP 106 a means to switch between applications without foregoing viewing a select media program that was interrupted during the call.

Figure 4:
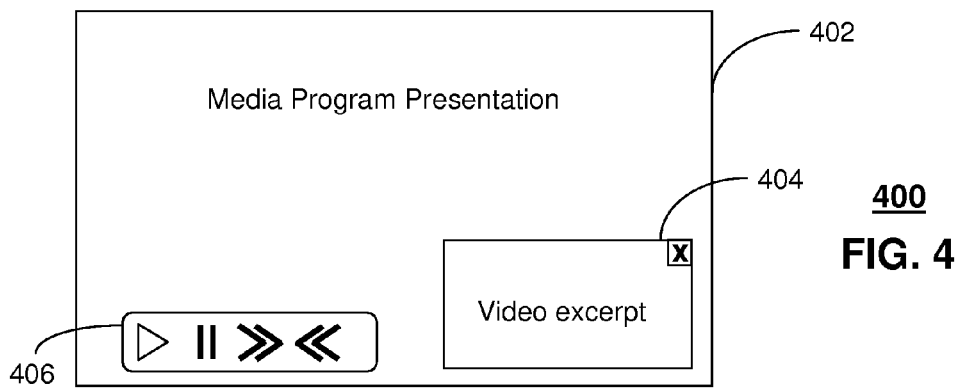
FIG. 4 depicts an exemplary embodiment of a graphical user interface resulting from an application of the method of FIG. 3.

It should be noted that the subscriber can also direct the MCP 106 to resume presentation of the media program by selecting with the media controller 107 a play button presented as a toolbar 406 in canvas 402 (see FIG. 4). Accordingly, the subscriber of the MCP 106 can choose to view the media program while the subscriber engages in a voice and/or video communication session with the calling party.

Figure 5:
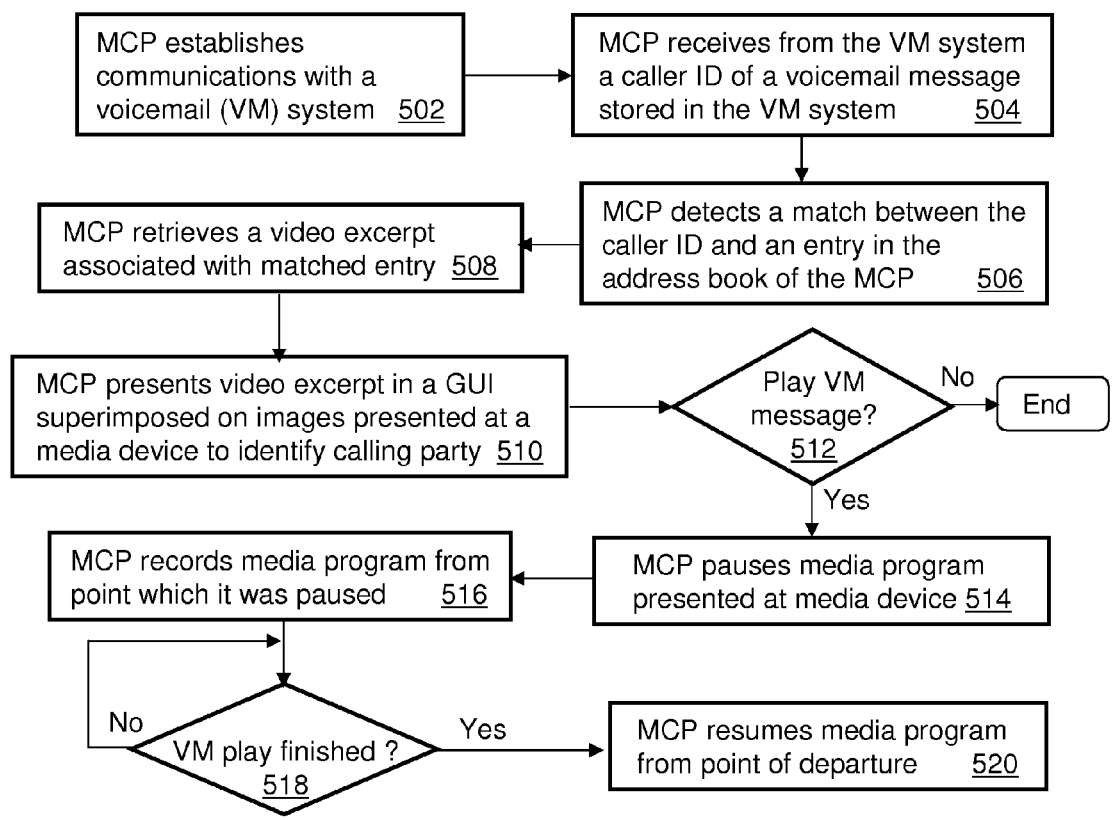
FIG. 5 depicts another exemplary method operating in portions of the communication system.

FIG. 5 depicts another exemplary method 500 operating in portions of the communication system 100. Method 500 begins with step 502 in which the MCP 106 establishes communications with voicemail (VM) system 225 as directed by the subscriber with the media controller 107 (e.g., by selecting a "Voicemail" button). Once communications have been established with the VM system 225 via the IMS network 250, the MCP 106 can receive from the VM system a caller ID for each voicemail message stored in said system. The caller ID can be recorded by the VM system 225 from signaling information it processed during a communication session with the calling party that was redirected to the VM system as a result of the subscriber not answering the call. Alternatively, the VM system 225 can retrieve by common speech processing techniques a callback number supplied in the voicemail message by the calling party.

The MCP 106 can detect in step 506 a match between the caller ID and an entry in the address book of the MCP. When this detection is made, the MCP 106 in step 508 can retrieve a video excerpt (if one is available) associated with the matched entry. The video excerpt as described above can be pre-recorded and associated with an entry in the address book by the actions of steps 302-306. Once the excerpt is retrieved, it is presented by the MCP 106 in step 510 by way of GUI 404. With this presentation method, the subscriber can browse through voicemail messages and quickly identify the calling party of each of the recorded voicemail messages. In step 512, the MCP 106 can monitor whether the subscriber has made a selection to playback one of the voicemail messages. If playback is not requested, method 500 ends and can be repeated for the other voicemail messages recorded by the VM system 225. If playback is selected, the MCP 106 can be programmed to pause the media program in step 514 from a departure mark, and record it from said mark in step 516 as previously described.

Once the MCP 106 detects in step 518 that the message has been played in full, and/or the subscriber decides to terminate communications with the VM system 225, the MCP can proceed to step 520 where it resumes playback of the media program from the departure mark as described earlier. As before, the subscriber can maintain presentation of the media program while voicemail is also being played by selecting the playback button of toolbar 406.

Upon reviewing the aforementioned embodiments, it would be evident to an artisan with ordinary skill in the art that said embodiments can be modified, reduced, or enhanced without departing from the scope and spirit of the claims described below. For example method 500 can be adapted so that video excerpts can be replaced with any type of image excerpt including still images. Video excerpts can also be generated by common means (e.g., cell phone with camera) by the subscriber (not just the calling party). The subscriber can also download free or payable video content from sources on the Internet and associate said content with entries of an address book. Additionally, methods 300 and 500 can be adapted to operate on other communication devices other than the MCP 106. For instance said methods can be applied to portable communication devices 116 such as cell phones and laptop computers with access to a wireless network (e.g., WiFi or cellular).

These are but a few examples of modifications that can be applied to the present disclosure without departing from the scope of the claims. Accordingly, the reader is directed to the claims section for a fuller understanding of the breadth and scope of the present disclosure.

Figure 6:
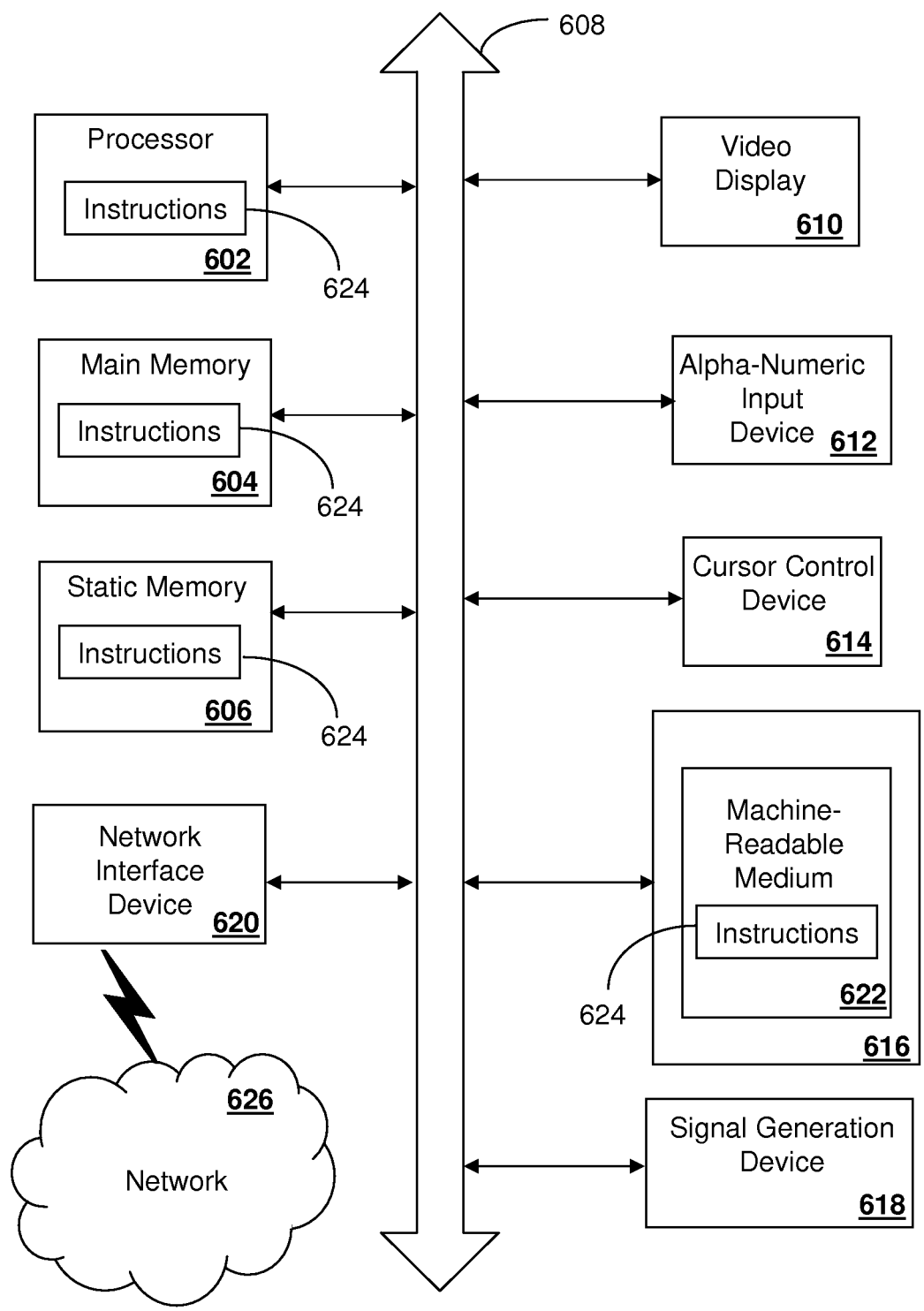
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, computer-readable storage medium, comprising computer instructions that responsive to being executed by a processor cause the processor to perform operations comprising:
    presenting at a media device images associated with a media program decoded from a media content source;
    receiving from a communication device of a calling party a video excerpt with a communication identifier of the calling party;
    identifying a matching entry of an address book according to the communication identifier of the calling party;
    responsive to identifying the matching entry, presenting at the media device an option to establish an association between the video excerpt and the matching entry of the address book;
    receiving, from equipment of a subscriber, an acceptance of the association;
    responsive to the receiving of the acceptance of the association, storing the video excerpt with the matching entry of the address book, resulting in a stored video excerpt, wherein the stored video excerpt is associated with the communication identifier;
    receiving a request from the communication device of the calling party to establish communications with the media device;
    identifying a caller identification from the request to establish communications;
    detecting a second match between the caller identification and the communication identifier stored in the entry of the address book; and
    responsive to the detect second match:
        presenting at the media device a graphical user interface superimposed on the images associated with the media program; and
        presenting the stored video excerpt associated with the communication identifier in the graphical user interface to identify the calling party.

2. The non-transitory, computer-readable storage medium of claim 1, wherein the media device operates in one among an Internet protocol television communication system, a satellite television communication system, a cable television communication system, or combinations thereof, and wherein the media device corresponds to a set-top box receiver.

3. The non-transitory, computer-readable storage medium of claim 1, wherein the media device corresponds to one among a television set, a computer, a personal digital assistant, cellular phone, or combinations thereof.

4. The non-transitory, computer-readable storage medium of claim 1, further comprising computer instructions that when executed by the processor cause the processor to perform operations comprising:
    pausing presentation of the media program responsive to presenting the video excerpt; and
    recording the media program from a departure mark associated with a time when the presentation of the media program is paused.

5. The non-transitory, computer-readable storage medium of claim 4, further comprising computer instructions that when executed by the processor cause the processor to perform operations comprising resuming presentation of the media program from the departure mark responsive to detecting a termination of communications with the communication device of the calling party.

6. The non-transitory, computer-readable storage medium of claim 1, wherein the video excerpt that is received from the device of the calling party is recorded by the communication device of the calling party.

7. The non-transitory, computer-readable storage medium of claim 1, wherein the video excerpt that is supplied by the communication device of the calling party is selected from a catalog of video excerpts.

8. A communication device, comprising a memory coupled to a controller, wherein the memory comprises computer instructions which, responsive to being executed by the controller, cause the controller to perform operations comprising:
    presenting, at a media device, images associated with a media program decoded from a media content source;
    receiving from a communication device of a calling party a video excerpt with a communication identifier of the calling party;
    identifying a matching entry of an address book according to the communication identifier of the calling party;
    responsive to identifying the matching entry, presenting at the media device an option to establish an association between the video excerpt and the matching entry of the address book;
    receiving, from equipment of a subscriber, an acceptance of the association;
    responsive to the acceptance of the association, storing the video excerpt with the matching entry of the address book, resulting in a stored video excerpt, wherein the stored video excerpt is associated with the communication identifier;
    receiving a request from a first communication device of a calling party to establish communications with the media device;
    identifying a caller identification from the request to establish communications;
    detecting a second match between the caller identification and the communication identifier stored in the entry of the address book; and
    responsive to the detecting of the second match:
        presenting at the media device a graphical user interface superimposed on the images associated with the media program; and
        presenting the stored video excerpt associated with the communication identifier at the media device to identify the calling party.

9. The communication device of claim 8, wherein the video excerpt that is supplied by the first communication device of the calling party is recorded by the first communication device of calling party.

10. The communication device of claim 8, wherein the video excerpt that is supplied by the first communication device of the calling party is selected from a catalog of video excerpts.

11. The communication device of claim 8, wherein the communication device corresponds to one among a cellular phone, a portable computer, or a combination thereof, each capable of operating in one among a cellular network, a wireless fidelity network, a worldwide interoperability for microwave access network, or a combination thereof.

12. The communication device of claim 8, wherein the video excerpt is provided within a graphical user interface within the media device.

13. The communication device of claim 8, wherein the communication device operates in one among an Internet protocol television communication system, a satellite television communication system, a cable television communication system or a combination thereof, and wherein the media device corresponds to a set-top box receiver.

14. The communication device of claim 8, wherein the communication device corresponds to one among a television set, a computer, a personal digital assistant, a cellular phone, or a combination thereof.

15. A method, comprising:
   presenting, by a system comprising a processor, at a media device images associated with a media program decoded from a media content source;
   receiving, by the system, from a communication device of a calling party a video excerpt with a communication identifier of the calling party;
   identifying, by the system, a matching entry of an address book according to the communication identifier of the calling party;
   responsive to identifying the matching entry, presenting at the media device an option to establish an association between the video excerpt and the matching entry of the address book;
   receiving, from equipment of a subscriber, an acceptance of the association;
   responsive to the acceptance of the association, storing, by the system, the video excerpt with the matching entry of the address book, resulting in a stored video excerpt, wherein the stored video excerpt is associated with the communication identifier;
   receiving, by the system, a request from the communication device of the calling party to establish communications with the media device;
   identifying, by the system, a caller identification from the request to establish communications;
   detecting, by the system, a second match between the caller identification and the communication identifier stored in the entry of the address book;
   responsive to the detecting of the second match:
      presenting at the media device a graphical user interface superimposed on the images associated with the media program; and
      presenting, by the system, the stored video excerpt associated with the communication identifier in the graphical user interface to identify the calling party.

16. The method of claim 15, wherein the media device corresponds to one among a television set, a computer, a personal digital assistant, a cellular phone, or a combination thereof.

17. The method of claim 15, further comprising computer instructions that when executed by the processor, cause the processor to perform operations comprising:
   pausing presentation of the media program responsive to presenting the video excerpt; and
   recording the media program from a departure mark associated with a time when the presentation of the media program is paused.

18. The method of claim 17, further comprising computer instructions that when executed by the processor, cause the processor to perform operations comprising resuming presentation of the media program from the departure mark responsive to detecting a termination of communications with the communication device of the calling party.

19. The method of claim 15, wherein the video excerpt that is received from the device of the calling party is recorded by the communication device of the calling party.

20. The method of claim 15, wherein the video excerpt that is supplied by the communication device of the calling party is selected from a catalog of video excerpts.

\* \* \* \* \*